Figure 1:
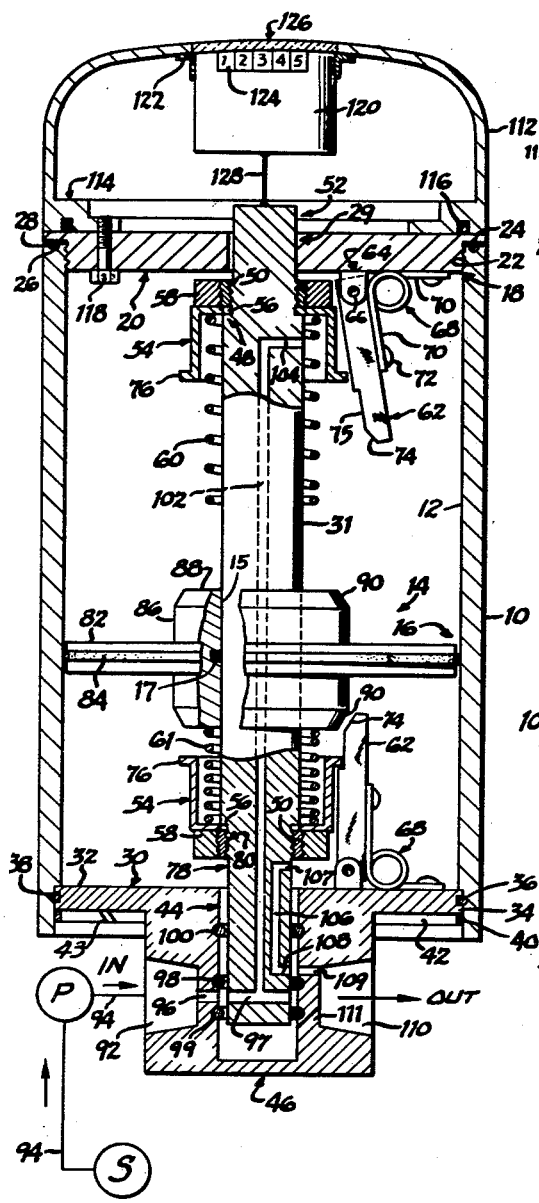

INVENTOR.
EDMUND H. BLAKEMAN
BY
WILSON, SETTLE & CRAIG
ATTORNEYS

United States Patent Office 3,192,769
Patented July 6, 1965

3,192,769
LOW FLOW METER FOR LIQUIDS
Edmund H. Blakeman, 1155 Fairfax, Pontiac, Mich.
Filed May 31, 1963, Ser. No. 284,503
3 Claims. (Cl. 73—251)

This invention relates to flow meters for liquids and more particularly to flow meters adapted to accurately measure low volumes of flow of liquid materials.

Still more particularly, this invention relates to a liquid fuel feeding system comprising a low flow meter of novel structure.

STATE OF THE ART

It has been largely customary heretofore to heat grouped multiple dwellings such as trailer homes, apartments, and the like utilizing individual fuel reservoirs such as oil tanks for each unit. These reservoirs consume valuable space and are characterized by the fact that they impart a sharp fuel oil odor to the dwelling in which contained. In the case of automobile trailers, space is at such a premium that the tanks cannot be mounted within the unit, but must instead be attached to the exterior thereof or otherwise disposed adjacent the structure on a suitable support to provide gravity flow into the structure. It will be readily appreciated that such exposed units are unsightly and when used individually for each trailer, detract substantially from the appearance of the court.

Accordingly, a substantial step forward in the art of multiple dwelling operations would be provided by the utilization of a main oil storage tank buried or otherwise concealed at a discreet distance from the trailer units, and working in cooperation with a pump and a small and inconspicuous flow meter attached to, made a part of, or positioned adjacent each trailer, and receiving oil from the main storage tank by concealed supply line.

It is accordingly an important object of the present invention to provide a novel, liquid fuel metering system.

A further object is to provide a novel meter for liquids, adapted to measure accurately under conditions of low flow.

Another object is to provide a fuel meter for liquids, characterized by an ability to measure liquid flow under low pressure and low volume, but with extreme accuracy.

Other objects of this invention will appear in the following description and appended claims, reference being had to the accompanying drawings forming a part of this specification wherein like reference characters designate corresponding parts in the several views.

Figure 2:
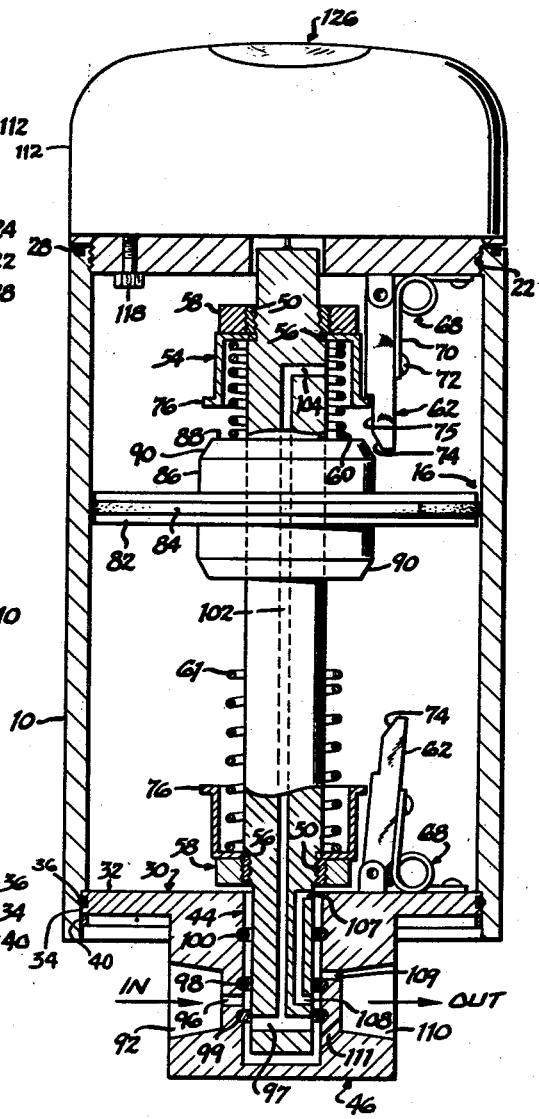

FIGURE 1 is a longitudinal section view of the meter of invention, with the piston at one end of the stroke; and FIGURE 2 is a section view similar to FIGURE 1, but showing the piston at the other end of the stroke.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

This application is related to structures disclosed and claimed in my copending application Serial Number 108,950, filed May 8, 1961, now U.S. Patent No. 3,126,-740, and entitled "Metering Valve."

PERSPECTIVE VIEW

Briefly, the meter of the present invention is a highly accurate device for measuring the flow of liquids, such as hydrocarbon fuels, passing by pressure through a conduit from a source of supply to a point of consumption.

The meter of invention is adapted to very accurately measure low liquid flow and utilizes a unique floating piston which reciprocates in response to liquid being fed alternately to one side and then the other, with a reciprocating valve cooperating with and actuated by the piston. As will become apparent, one specific structure comprises a cam and stop arrangement situated at the terminal ends of the stroke of the piston and in part carried by the reciprocating valve.

SPECIFIC DESCRIPTION OF THE INVENTION

As an introduction, it is to be pointed out that FIGURES 1 and 2 are similar views, as regards the configuration and interrelation of parts, but show different positions of stroke of the piston. For purposes of the following description, accordingly, either figure of the drawing may be used as reference; however, later on when the functioning of the apparatus is described, reference will be made to both figures in a particular order, for clarity of understanding.

As shown on the drawings, the meter of invention includes a cylindrical casing 10 having a smooth interior bore 12. A free floating piston 14, as will be described in further detail later, has an O-ring seal 16 at the periphery to slidably engage the bore 12 for a movement back and forth in the cylinder 10. The O-ring seal of course provides a separation and prevents flow of liquid between one side of the piston and the other.

Top cylinder head

At the upper end, the cylinder 10 is interiorly threaded a short distance as at 18. This thread 18 receives a top cylinder head 20, which is a generally circular disc, threaded as at 22 to engage the thread 18 of casing 10. At the top, the cylinder head 20 has a radially extending lip 24, having an outer periphery the same diameter as casing 10. This assures continuity of the smooth, cylindrical exterior surface of casing 10 and presents a clean appearance. The top edge of the casing 10 is provided with a groove 26 receiving an O-ring 28 for fluid tight seal as will be obvious.

Top cylinder head 20 includes a coaxial bore 29 to slidably receive the upper end of a reciprocating valve rod 31 to be later described.

The bottom cylinder head

The bottom cylinder head is designated by the reference numeral 30 and comprises a disc-like portion 32. The bottom of the cylinder is counterbored at 34, terminating in a shoulder 36 to receive the outer periphery of the disc portion 32 in fairly snug engagement. A groove 38 is provided in the outer periphery of disc portion 32 and carries an O-ring for a tight seal with the counterbore 34. A radially extending groove 40 is provided adjacent the bottom edge of cylinder 10 to receive a snap ring 42 spliced at 43 and which locks the disc 32 to the shoulder 36, thus holding the bottom cylinder head 30 in assembled relationship.

Centrally, the bottom cylinder head 30 is coaxially bored as at 44 to receive the bottom end of the valve rod 31.

The bottom cylinder head 30 also includes a lower body portion 46. This portion 46 contains valving elements in the form of O-ring separating seals which will become apparent in the following description.

The valve rod

The reciprocating valve rod was previously mentioned and designated generally by the reference numeral 31. More particularly, this unit 31 is an elongated cylindrical rod generally of uniform diameter. However, it is reduced in diameter slightly at the upper end to provide a shoulder 48 with a thread 50 thereabove. Above the thread 50, the portion 52 of reduced diameter is smooth for a free sliding fit through the coaxial bore 29 of top cylinder head 20. A spring cup and cam actuator 54 of annular configuration has a coaxial bore 56 to fit over the reduced diameter portion 52, thread 50 and seat against shoulder 48. A threaded ring 58 is turned on to thread 50 and locks the cup 54 in assembled position against the shoulder 48. An upper spring 60 is first applied, of course, and works against the bottom of cup 54 by piston 14, as will become apparent later.

A cam and lock arm designated by the reference numeral 62 has one end pivotally mounted to the bottom side of the upper cylinder head 20 by a bifurcated boss 64. A pin 66 is passed through a bore in each of the arms of the boss 64 and the end of the cam and lock arm 62, as will be apparent for pivot mounting.

A coil spring 68 has the arms 70 thereof looped at the ends and screws 72 are passed through the loops and into the arm 62 and cylinder head 20 respectively for assembly.

The cam and lock arm 62 is provided at its terminal end with a cam surface 74 and adjacent and rearwardly thereof a notch 75. The spring cup and cam actuater 54 is provided with a lip 76 to fit over or into the notch 75 of lock arm 62 in the manner illustrated at the top of FIGURE 2 and at the bottom of FIGURE 1. Functioning of this assembly of the apparatus will become apparent here and after.

The bottom end of valve rod 31 is also provided with a slightly reduced diameter portion, but of substantial length and designated 78.

At its upper end, reduced diameter portion 78 terminates in a shoulder 80 and an annular spring cup and cam actuator 54 with a coaxial bore 56 is fitted against the shoulder. A thread 50 is provided adjacent the shoulder 80, as at the upper end of the rod 31, and a ring 58 is run onto the thread to lock the cup 54 in position.

The cup 54 also includes a lip 76 as previously described. A cam and lock arm 62 is provided at the bottom end of the configuration previously described, and a spring 68 is operable to bias the arm 62 into engagement with the cup, as will be evident.

A lower spring 61 fits on valve rod 31 between the lower cup 54 and the bottom side of the piston 14.

From the foregoing, it will be understood that piston 14 is bored at 15 to receive the valve rod 31 and operates between the inner ends of springs 60 and 61. Although not necessarily limited to this particular configuration, the piston includes a radially extending web section 82 with a groove 84 at the periphery, carrying the previously mentioned O-ring 16. An O-ring 17 on valve rod 31 provides a seal between the exterior surface of the valve rod and the bore 15 of the piston to isolate the top and bottom of the piston.

The central body portion of the piston 14 is axially extended on each side of the radial web 82 and takes the configuration of a generally cylindrical annular hub 86. End faces 88 of annular disc-like configuration and directly radially extending are provided. A chamber 90 is provided along each end corner between faces 86 and 88 for purposes of engaging the upper and lower cam and lock arm 62 by cam surface 74. These are effective to push the lock arms out, as will be apparent.

THE PORTING SYSTEM

An inlet port is provided in body portion 46 of bottom head 30 and is designated by the reference numeral 92; this is adapted to receive in threaded or otherwise properly fitted relationship an inlet conduit designated by the reference numeral 94. The inlet port 92 is necked down to an inlet passage 96 that leads into the bore 44. The valve rod 31 is through-bored transversely at 97 at its lower end, the bore 97 alignable with passage 96. On each side of the passage 96 are annular grooves 98 and 99, receiving appropriate O-rings. It will be evident that the bore 97 is slidable past the lower O-ring 99 as will become apparent later. In FIGURE 1, the valve rod 31 is shown at its extreme upper limit of travel.

Positioned above the O-ring groove 98 is a groove 100 also receiving an O-ring which functions as a seal to isolate the bottom of the cylinder from the subjacent valve chamber which comprises the bottom of the bore 44 and contains the O-rings 98, 99 which function as valves.

Extending coaxially of the valve rod 31 is a bore 102 terminating short of the upper end of the rod. This connects with through-bore 97 at the bottom. A transverse passage 104 leads from bore 102 to the exterior of the rod 31 on the top side of the piston 14. Since bore 97 is a through-bore, the system 97, 102, 104 serves both as inlet and outlet conduits as will become apparent.

The inlet, outlet for the chamber defined by the bottom side of the piston comprises an axial bore 106, terminating at its top and bottom ends in radial bores 107 and 108. These straddle the upper groove O-ring system 100, and the bottom radial bore 108 is movable across the O-ring system 98 which, like the O-ring system 99, is effective to function as a valve.

To accommodate flow out of the unit, there is provided an upper radial bore 109 leading to an outlet port 110. Also leading to the outlet port 110 is a lower transverse bore 111. A suitable conduit leads to the point of consumption from the outlet port 110.

THE COUNTER

As shown in FIGURE 1, a dome-like cap 112 fits in covering relation over the upper end of the cylindrical casing 10. This is of generally semispherical shape and includes an annular rim 114 having a groove 116 on the face thereof containing an O-ring which provides a seal between the top side of head 20 and the rim 114. Bolts 118 are passed through appropriate apertures in head 20 and rim 114 before the head 20 is applied, in order to connect the cap 112 to the unit. Thus, when the cap 112, head 20, assembly is threaded into place, an entirely sealed unit is provided against tampering.

A decimal-type counter 120 of the successive digit type is suitably attached as by small brackets 122. The counter 120 has a plurality of indicating rolls 124 at the top thereof positioned to be visible through the window 126. An actuator arm 128 extends downwardly from the bottom of the counter 120 into engageable relation with the top end of the valve rod 31. The actuator arm 128 is spring loaded against the valve rod and is of the reciprocating type, thus adapted to be actuated by reciprocating movement of the valve 31. The counter 120 is calibrated in suitable measure such as pints, quarts or gallons, and registers upon each reciprocation of the meter of invention. Thus, a tally of the monthly or other periodic consumption is made by reference to the indicia numbers showing through the window 126.

Relative to the freedom of movement of the upper end of the valve rod 31 through the bore 29, it will be evident that oil can flow into the cavity containing the meter. By so operating, the meter is suitably a sealed unit or it may optionally be of the type which can operate in an oil environment.

If desired, it is of course to be understood that an O-ring can be placed in surrounding relationship to the upper end of the valve rod 31, whereby leakage into the counter chamber can be prevented.

OPERATION

Having described the configuration and inner relationship of parts, we will now by reference to both FIGURES 1 and 2 describe the function of the apparatus.

As a prelude to the description of the operation of the apparatus, it is pertinent to point out that the inlet conduit 94 is operably connected to a pump P, and from the pump leads to a source tank S such as underground tank, elevated tank, or other suitable reservoir for liquid.

*Down piston motion*

Now continuing with a description of the operation, I note that in FIGURE 1, the piston 14 is down and moving further downward to the point where the chamfer 90 is about ready to engage the cam surface 74 of the lower cam and lock arm 62. This is effected by the fact that liquid under pressure moves from pump P through line 94 into inlet port 92, proceeding thence through inlet passage 96, passing to transverse bore 97 of the valve rod 31 and then proceeding axially of the rod through bore 102 and out bore 104 into the cylinder above the piston. This forces the piston 14 downwardly. It will be noted that the valve rod 31 is at the top limit of its movement, being locked and held in place by the lower cam and lock arm 62. At this point, it should be noted that the upper cam and lock arm 62 is released so that the valve rod 31 could be moved to the extreme upper limit of its movement.

Let it be visualized that the piston 14 continues to move downwardly so that the chamfer surface 90 engages the cam surface 74 and pivots the cam and lock arm 62 to the right. By virtue of the fact that the piston has moved downwardly, the coil spring 61 has been compressed. When the cam and lock arm 62 is moved to the right, the stored energy of the spring 61 forces the valve rod 31 downwardly in a substantially instantaneous movement to assume the position of FIGURE 2. This, of course, reverses the valving and will cause the piston to reverse its movement. Such reverse movement will cause oil to be released out of the top end of the cylinder and new oil to be pumped into the bottom end of the cylinder.

At this point, it should be noted that the prior downward movement of the cylinder has caused oil previously drawn into the bottom of the cylinder to be exhausted therefrom. This takes the route via radial bore 107, axial bore 106, radial bore 108 and out radial outlet bore 109, thence through outlet port 110.

*Up piston motion*

Reverting now to the action which takes place when the piston moves upwardly, let me refer to FIGURE 2. There it will be noted that oil flows out of the unit from the top end of the cylinder through radial bore 104, coaxial bore 102 and back down to radial bore 97. This prior downward movement of the valve rod 31 has placed radial bore 97 below the lower O-ring seal-groove system 99, thus shutting off transverse passage 97 from incoming liquid via passage 96. This permits the outflow to pass through lower transverse bore 111 to outlet port 110, providing smooth exhaust and flow from the upper end of the cylinder above the piston 14.

While this action is taking place, a simultaneous intake action to the bottom side of the piston is taking place. This is effected by passage of liquid through inlet port 92, inlet passage 96, thence around valve rod 31 and into radial bore 108, flowing upwardly through axial bore 106 and out radial bore 107 to the bottom end of the cylinder 10, beneath the piston 14.

Prior reversal downwardly of the valve rod 31 caused the upper spring cup and cam actuator 54 to move downwardly a sufficient distance so that upper spring 68 could drive the upper cam and lock arm 62, so that the notch 75 locks the lip 76 in a down position. This is shown at the top in FIGURE 2.

Now referring further to FIGURE 2, let it be visualized that the piston 14 continues to move upwardly. In the position of parts shown, the chamfer 90 is about to engage the cam surface 74 and unlock the upper cam and lock arm 62 and permit the stored energy of the upper spring 60 to drive the valve rod 31 upwardly back to the position of FIGURE 1.

Of course, it is to be understood that as this happens, oil is exhausted from the top side of the cylinder by the route previously described and new oil pumped into the bottom end of the cylinder by the route previously described. Thus, a complete cycle is provided.

ADVANTAGES OF THE PRESENT INVENTION

The present invention is characterized by a novel unitized structure wherein all working parts are contained within a sealed casing. Thus there is no leakage problem.

The unit is further characterized by simplicity of parts and arrangement; and no moving parts are exposed; thus protection is provided against abrasive and/or corrosive ambient atmospheric elements.

The unit is also characterized by the fact that the meter is sealed against tampering in a very effective manner.

I claim:

1. In a flow meter for liquids,
   a cylinder having each end closed by a cylinder head,
   each cylinder head including a coaxial bore,
   a valve rod in said cylinder and extending between said cylinder heads and having the ends slidably received in said bores for reciprocation relative to said cylinder,
   a piston having a bore receiving said valve rod and movable in said cylinder between said heads and relative to said rod,
   means for locking said valve rod at its extremes of travel,
   means operable by said piston to move said rod in the direction of piston travel and release said locking means,
   one of said cylinder heads having an inlet port and an outlet port, said valve rod having two fluid passages one of which communicates with said inlet port on one end and on the other end with the space on one side of said piston while the other of said passages communicates with the space on the opposite side of said piston and said outlet port when said valve rod is in one position and said first named passage communicates with said outlet port and said second named passage communicates with said inlet port when said valve rod is in another position.

2. In a flow meter for liquids,
   a cylinder having each end closed by a cylinder head,
   each cylinder head including a coaxial bore,
   a valve rod in said cylinder and extending between said heads and having the ends slidably received in said bores for reciprocation,
   a piston having a bore receiving said valve rod and movable in said cylinder between said heads and relative to said rod,
   an actuator carried adjacent each end of said rod,
   resilient biasing means between each said actuator and said piston,
   a lock arm carried by each said head and respectively engageable with said actuators to lock said valve rod in each extreme position of travel,
   said cylinder engageable with a lock arm in each extreme position of travel to release the arm from lock engagement with an actuator and bias said valve rod in the direction of piston travel to reverse flow through said meter and reverse the piston,
   one of said cylinder heads having an inlet port and an outlet port, said valve rod having two fluid passages one of which communicates with said inlet port on one end and on the other end with the space on one side of said piston while the other of said passages communicates with the space on the opposite side of said piston and said outlet port when said valve rod is in one position and said first named passage communicates with said outlet port and said second named passage communicates with said inlet port when said valve rod is in another position.

3. In a flow meter for liquids, a cylinder having each end closed by a cylinder head, each head including a coaxial bore,
a valve rod extending between said heads and having the ends slidably received in said bores for reciprocation,
a piston having a bore receiving said valve rod and movable in said cylinder between said heads and relative to said valve rod,
a spring cup and cam actuator carried adjacent each end of said rod,
spring means between each said spring cup and cam actuator and said piston,
a cam and lock arm carried by each of said cylinder heads and respectively engageable with a spring cup and cam actuator to lock said valve rod in each extreme position of travel,
said cylinder carrying abutment means engageable with said lock arms to release each arm from lock position with a spring cup and cam actuator, said spring being effective to bias said valve rod in the direction of piston travel to reverse flow through said meter and reverse the piston,
an inlet port and an outlet port in one of said cylinder heads,
first and second conduit means formed in said valve rod in the end carried by said ported cylinder head,
valve means separating said first and second conduit means,
a first bore within said rod and extending between said second conduit and the other side of said piston,
and said valve means placing one of said conduit means in communication with said inlet port and one of said conduit means in communication with said outlet port in one extreme position of said valve rod and vice versa in the other extreme position of said valve rod.

References Cited by the Examiner
UNITED STATES PATENTS

| | | | |
|---|---|---|---|
| 173,379 | 2/76 | Wells | 73—251 X |
| 479,277 | 7/92 | Holt | 73—251 |
| 1,148,943 | 8/15 | Young | 73—225 |
| 1,534,238 | 4/25 | Mercer | 73—251 |
| 1,586,834 | 6/26 | Ormsby | 73—251 |
| 1,901,178 | 3/33 | Malm. | |
| 1,929,719 | 10/33 | Werder. | |
| 3,126,740 | 3/64 | Blakeman | 73—251 |

RICHARD C. QUEISSER, *Primary Examiner.*